US010608562B1

(12) United States Patent
Lee et al.

(10) Patent No.: US 10,608,562 B1
(45) Date of Patent: Mar. 31, 2020

(54) SYSTEM AND METHOD FOR ESTIMATING ROTOR SENSOR OFFSET

(71) Applicant: GM Global Technology Operations LLC, Detroit, MI (US)

(72) Inventors: Young Joo Lee, Rochester, MI (US); Kibok Lee, Ann Arbor, MI (US); Brian J. Gallert, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/181,801

(22) Filed: Nov. 6, 2018

(51) Int. Cl.
*H02P 6/16* (2016.01)
*H02P 6/28* (2016.01)
*H02P 6/08* (2016.01)

(52) U.S. Cl.
CPC .............. *H02P 6/16* (2013.01); *H02P 6/08* (2013.01); *H02P 6/28* (2016.02); *H02P 2203/03* (2013.01)

(58) Field of Classification Search
CPC ...... H02P 1/00; H02P 1/04; H02P 1/46; H02P 3/00; H02P 3/16; H02P 3/18; H02P 21/00; H02P 23/00; H02P 25/00; H02P 27/00; H02P 27/04; H02P 27/06; H02P 6/00; H02P 6/14; H02P 2203/11; H02P 6/185

USPC .... 318/400.01, 400.02, 400.14, 400.15, 700, 318/701, 721, 727, 799, 800, 801, 430, 318/432

See application file for complete search history.

(56) References Cited

U.S. PATENT DOCUMENTS

| 7,746,023 | B2 * | 6/2010 | Ajima | H02P 6/10 |
| | | | | 318/700 |
| 8,474,095 | B2 * | 7/2013 | Clothier | A47L 5/24 |
| | | | | 15/412 |
| 9,184,681 | B2 * | 11/2015 | Oyobe | H02P 21/0025 |
| 10,326,389 | B2 * | 6/2019 | Lu | H02P 27/08 |
| 2005/0247350 | A1 * | 11/2005 | Coakley | G01D 5/145 |
| | | | | 137/554 |
| 2019/0157957 | A1 * | 5/2019 | Rho | G01D 5/20 |
| 2019/0165703 | A1 * | 5/2019 | Kim | H02P 21/12 |

* cited by examiner

*Primary Examiner* — Antony M Paul

(57) ABSTRACT

In an example, a system is disclosed. The system includes a rotor position estimation module configured to generate an adjustment signal to adjust a desired torque signal for a motor. The rotor position estimation module includes a sensor offset estimation module configured to estimate an offset position of a sensor based on (1) a motor current signal indicative of a current to rotate a rotor within the motor, (2) a motor voltage signal indicative of a voltage applied to a power inverter that provides the current to the motor, and (3) a motor parameter. The sensor can be disposed on the rotor. The rotor position estimation module also includes a speed adjustment module configured to generate the adjustment signal based on the estimated offset position.

20 Claims, 7 Drawing Sheets

SYSTEM AND METHOD FOR ESTIMATING ROTOR SENSOR OFFSET

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors, and more particularly relates to estimating an offset position of a rotor with respect to a desired position of the rotor.

Electric motors can be used in a variety of applications to deliver rotational energy. For example, vehicles use electric motors to partially or fully propel the vehicle. Hybrid vehicle systems use electric motors to supplement power for an internal combustion engine. Electric vehicle systems use electric motors as the primary source for generating torque.

Electric motors include a stator having stator windings and a rotor that rotates based on current flowing within the stator windings. The rotor typically includes one or more position sensors, such as Hall-effect sensors, disposed about the rotor. The position sense a position of the rotor with respect to the stator so that the controller can energize stator windings correctly to deliver the desired torque.

SUMMARY

In an example, a system is disclosed. The system includes a rotor position estimation module configured to generate an adjustment signal to adjust a desired torque signal for a motor. The rotor position estimation module includes a sensor offset estimation module configured to estimate an offset position of a sensor based on (1) a motor current signal indicative of a current to rotate a rotor within the motor, (2) a motor voltage signal indicative of a voltage applied to a power inverter that provides the current to the motor, and (3) a motor parameter. The sensor can be disposed on the rotor. The rotor position estimation module also includes a speed adjustment module configured to generate the adjustment signal based on the estimated offset position.

In other features, the system includes a speed control module configured to generate the desired torque signal. The speed control module is configured to adjust the desired torque signal based on the adjustment signal.

In other features, the system includes a current control module configured to generate a current signal based on at least one of the desired torque signal and the adjusted desired torque signal.

In other features, the system includes the power inverter, and the power inverter is configured to generate the current based on the current signal and provides the current to a plurality of stator windings within the motor to rotate the rotor according to the current signal.

In other features, the system includes a battery connected to the power inverter and the rotor position estimation module and is configured to provide direct current (DC) voltage.

In other features, the power inverter converts the DC voltage to a corresponding alternating current (AC) voltage and provides the AC voltage to the motor and the rotor position estimation module.

In other features, the system includes the motor, and the motor includes a rotary assembly that drives a vehicle based on the desired torque signal.

In other features, the rotary assembly comprises the stator and the rotor.

In other features, the sensor comprises a Hall-effect sensor disposed on the rotor.

In other features, the system includes memory that is configured that is configured to store the adjustment signal.

In an example, a method is disclosed. The method includes generating an adjustment signal to adjust a desired torque signal for a motor and estimating an offset position of a sensor based on (1) a motor current signal indicative of a current to rotate a rotor within the motor, (2) a motor voltage signal indicative of a voltage applied to a power inverter that provides the current to the motor, and (3) a motor parameter, wherein the sensor is disposed on the rotor. The method also includes generating the adjustment signal based on the estimated offset position.

In other features, the method includes generating the desired torque signal, wherein the desired torque signal is adjusted based on the adjustment signal.

In other features, the method includes generating a current signal based on at least one of the desired torque signal and the adjusted desired torque signal.

In other features, the power inverter is configured to generate the current based on the current signal and provides the current to a plurality of stator windings within the motor to rotate the rotor according to the current signal.

In other features, a battery is connected to the power inverter and is configured to provide direct current (DC) voltage.

In other features, the power inverter converts the DC voltage to a corresponding alternating current (AC) voltage and provides the AC voltage to the motor.

In other features, a motor receives the desired torque signal includes a rotary assembly that drives a vehicle based on the desired torque signal.

In other features, the rotary assembly comprises the stator and the rotor.

In other features, the sensor comprises a Hall-effect sensor disposed on the rotor.

In other features, the method includes storing the adjustment signal in a memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Rotor sensors provide signals to control systems to allow the control systems to sense a position of a rotor relative to a stator. The control systems use the sensed position to synchronize energizing of the stator windings according to the sensed position to produce desired torque. However, if the sensors are offset, or misaligned, the stator windings may be energized incorrectly resulting in incorrect torque generation. The sensor offset may occur during assembly of the stator and the rotor and/or due to undesired stator end turn flux.

The present disclosure is directed to a motor control system that estimates the position offset of the sensors relative to a reference position of the stator. Based on the estimated offset, the motor control system can generate adjustment signals that compensates torque signals accordingly.

Figure 1:
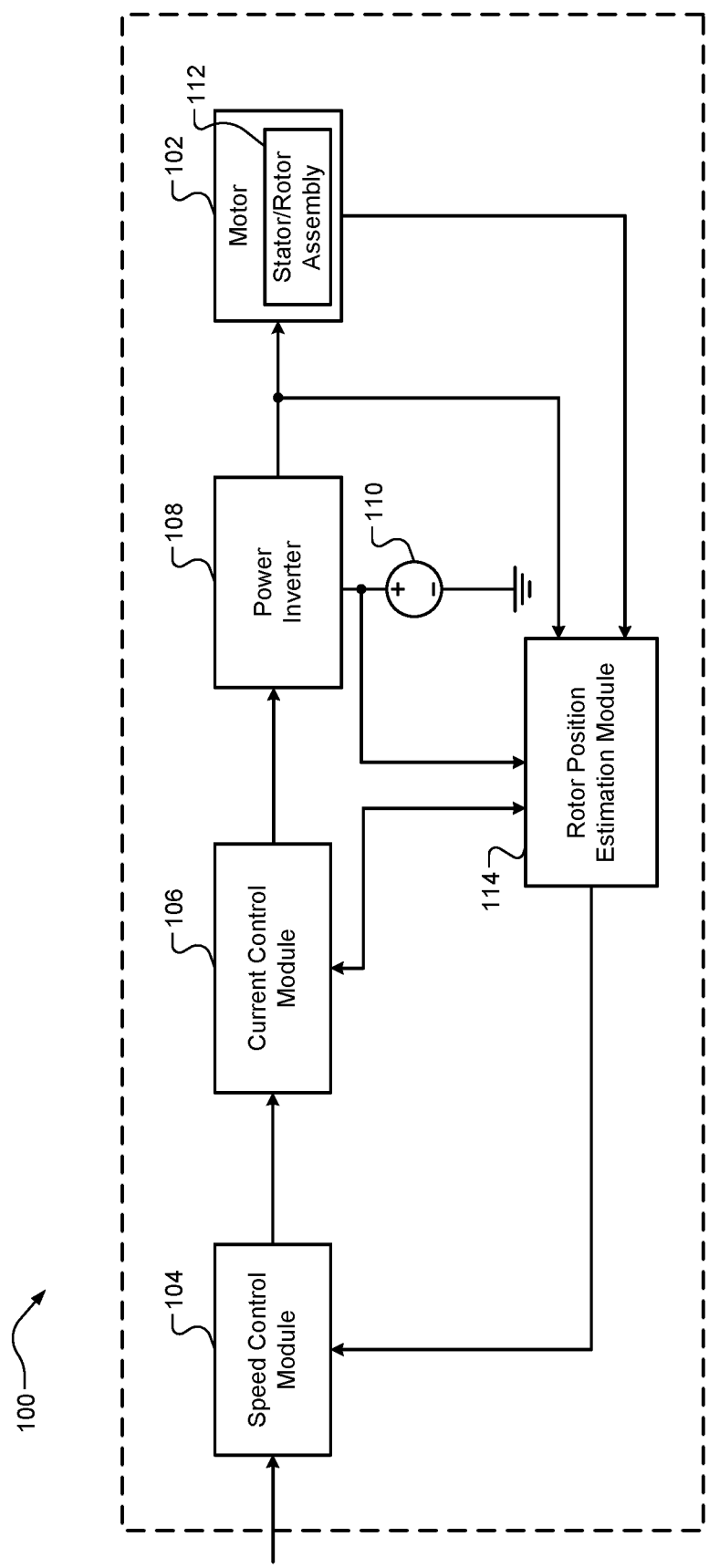
FIG. 1 is an example block diagram of a system for estimating an sensor offset according to an example implementation of the present disclosure.

FIG. 1 illustrates an example block diagram of a motor control system 100 for estimating a rotor offset of a motor. The motor control system 100 includes a motor 102 that produces torque. In an example implementation, the motor 102 may produce torque for a vehicle, such as a car, a truck, a boat, and the like. The motor 102 produces torque based on an input or a control setting. The motor 102 interfaces with a shaft to deliver mechanical power within the motor control system 100. For example, the motor 102 can interface with a shaft that drives the vehicle.

The input provided to the motor control system 100 may be provided in a variety of ways to control the motor 102. For example, the input may be based on driver input provided via a position of a pedal. In another example, the input may be provided by an accelerator. The input is received at a speed control module 104 that outputs a desired torque signal to a current control module 106. For example, the speed control module 104 may store one or more mappings of a position of the input, such as the pedal or the accelerator, to desired torque and outputs a desired torque signal.

The current control module 106 receives the desired torque signal and generates a current signal representing an amount of current be delivered to the motor 102. For example, the current control module 106 may store one or more mappings of desired torque to a current amount and outputs the current signal to a power inverter 108.

The power inverter 108 receives the current signal and is also connected to a battery 110. In an example implementation, the battery 110 is a direct current (DC) battery and provides DC power to the power inverter 108. The power inverter 108 converts DC power to alternating current (AC) power and provides the AC power to the motor 102. For example, the power inverter 108 can provide the AC power to the motor 102 using pulse-width modulation (PWM) techniques to control the amount of current and/or voltage provided to the motor 102.

The motor 102 includes a rotor and stator assembly 112 that includes stator windings to operate a rotor, which is shown in FIG. 2. For example, the power inverter 108 provides the AC power to the stator windings causing the rotor to rotate. The rotor is connected to a shaft to provide rotational energy within the system 100. In an example implementation, the rotor can be connected to a powertrain of a vehicle to propel the vehicle.

The motor control system 100 also includes a rotor position estimation module 114 that receives the AC power signal from the power inverter 108 and receives the DC power signal from the battery 110. As described herein, the rotor position estimation module 114 estimates an offset of the rotor. The rotor position estimation module 114 can provide an adjustment signal to the speed control module 104 that is based on the estimated offset. The speed control module 104 uses the adjustment signal to adjust the desired torque signal, and the current control module 106 generates a current control signal based on the adjusted desired torque signal.

Figure 2A:
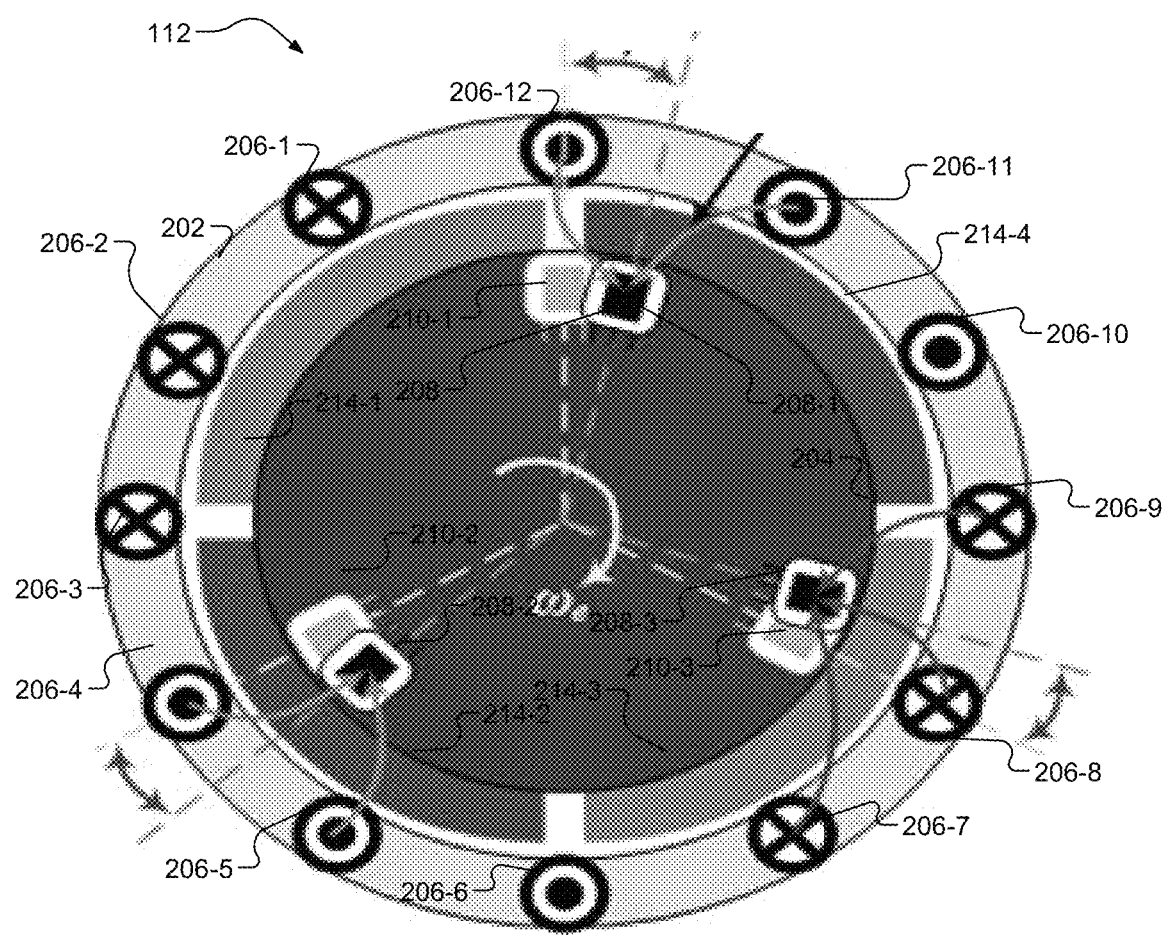
FIG. 2A is a cross-sectional diagrammatic illustration of a rotor and stator assembly according to an example implementation of the present disclosure.

FIG. 2A illustrates an example rotor and stator assembly 112. The rotor and stator assembly 112 includes a stator 202 and a rotor 204. The stator 202 includes stator windings 206-1 through 206-12. However, the stator 202 can include additional or fewer stator windings. The rotor 204 is disposed within the stator 202 and rotates based on current within the stator windings 206-1 through 206-12. The rotor 204 is connected one or more shafts of the powertrain to drive the wheels when the rotor 204 rotates.

The rotor 204 includes one or more sensors 208. The rotor 204 is illustrated as including sensors 208-1, 208-2, 208-3. It is understood that the rotor 204 may include additional or fewer sensors 208. In an example implementation, the sensors 208 comprise Hall-effect sensors. The sensors 208 measure a Hall voltage and generate a signal indicative of the measured Hall voltage. The signal generated by the sensors 208 can be provided to one or more modules within the system 100 to determine a position of the rotor 204 relative to the stator 202.

Reference characters 210-1, 210-2, 210-3 illustrate the desired positions of the corresponding sensors 208-1, 208-2, 208-3. However, the position of the sensors 208-1, 208-2, 208-3 may be offset with respect to the corresponding desired position 210-1, 210-2, 210-3 due to unwanted stator end turn flux and/or manufacturing variations in sensor alignment due to counter-electromotive forces, which results in a phase misalignment of the sensors 208-1, 208-2, 208-3. The rotor and stator assembly 112 also includes permanent magnets 212-1, 212-2, 212-3, 212-4.

Figure 2B:
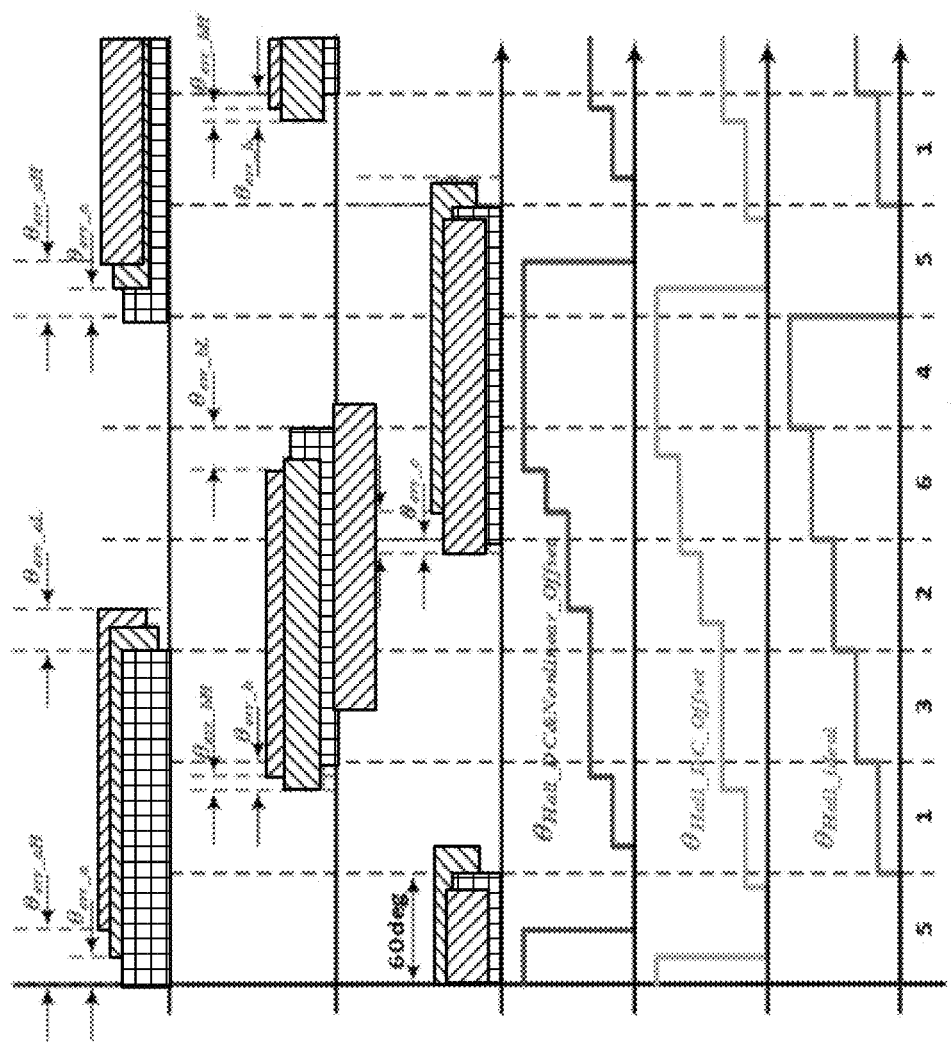
FIG. 2B is a graph illustrating various current signals for energizing one or more stator windings.

FIG. 2B illustrates graphs illustrating various ideal and offset motor current signals (Θ) provided to one or more stator windings. Hall-A, Hall-B, and Hall-C refer to the measurements of the respective Hall-effect sensor based on the current motor signals.

Figure 3A:
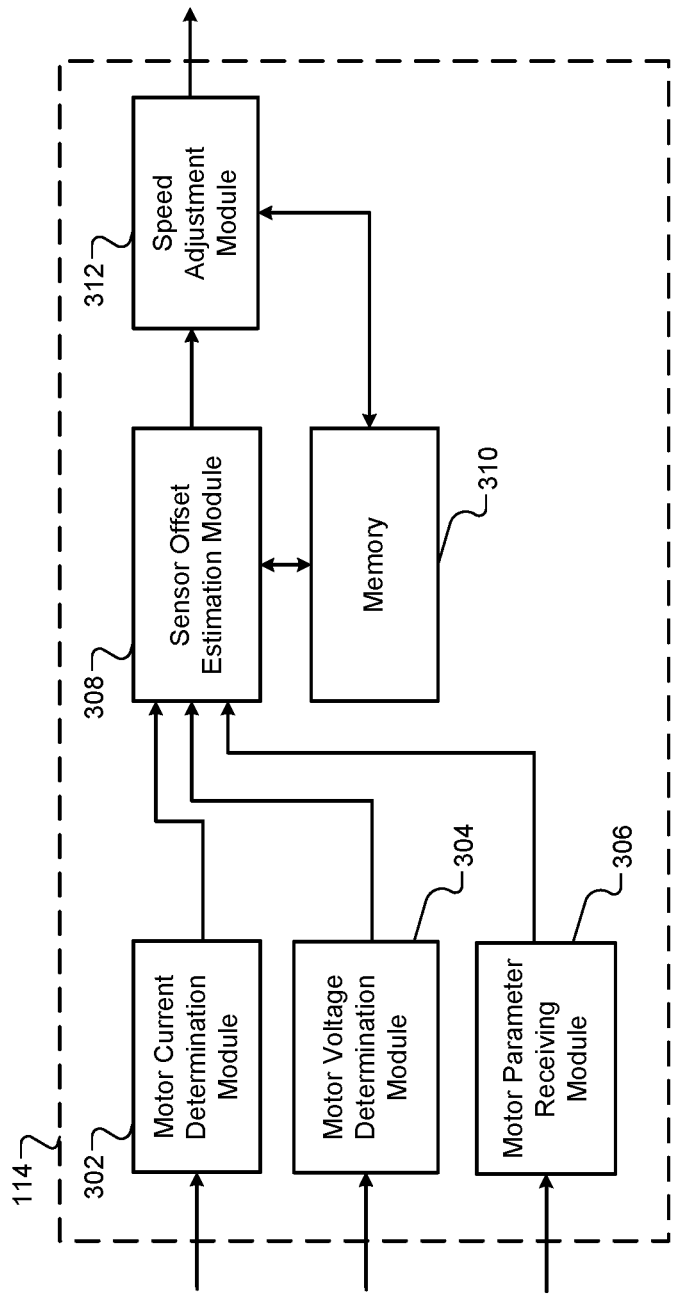
FIG. 3A is an example block diagram of a rotor position estimation module according to an example implementation of the present disclosure.

FIG. 3A illustrates an example rotor position estimation module 114. The rotor position estimation module 114 estimates an offset of the sensors 208-1, 208-2, 208-3 relative to the desired position 210-1, 210-2, 210-3 and provides the feedback signal based on the estimated offset.

As shown, the rotor position estimation module 114 includes a motor current determination module 302, a motor voltage determination module 304, a motor parameter receiving module 306, a sensor offset estimation module 308, memory 310, and a speed adjustment module 312.

The motor current determination module 302 receives the current signal provided to the motor 102 from the power inverter 108, and the motor voltage determination module 304 receives a motor voltage signal from the battery 110 and the power inverter 108. The motor parameter receiving module 306 receives one or more motor parameters from the motor 102. For example, one or more motor sensors can provide the motor parameters to the motor parameter receiving module 306. The motor parameters can include, but are not limited to, motor inductance, motor magnet intensity, and the like. The motor parameters can be measured by one or more sensors within the motor 102.

The sensor offset estimation module 308 receives a motor current signal from the motor current determination module 302, a motor voltage signal from the motor voltage determination module 304, and a motor parameter signal from the motor parameter receiving module 306. The sensor offset estimation module 308 estimates an offset of the rotor 204 based on the motor current signal, the motor voltage signal, and the motor parameter signal.

For example, using the motor current signal, the motor voltage signal, and the motor parameter signal, the sensor offset estimation module 308 estimates a speed of the motor 102 and estimates a position of the rotor 204 relative to the stator 202.

The sensor offset estimation module 308 can access the memory 310 to receive an estimated offset corresponding to the motor current, the motor voltage, and the motor parameters. The estimated offset can account for offsets relating to DC position error due to manufacturing variations with a motor current equal to zero and/or nonlinear position errors due to manufacturing variations with a motor current not equal to zero.

The sensor offset estimation module 308 estimates a speed of the motor 102 corresponding to the motor current, the motor voltage, and the motor parameters. For example, the memory 310 includes a look-up table that stores one or more mappings of the motor current, the motor voltage, and/or the motor parameters to Hall-effect sensor offset. The look-up table also stores one or more mappings of the motor current, the motor voltage, and/or the motor parameters to estimate motor speed. The sensor offset estimation module 308 determines a rotor offset and provides an offset rotor signal and an estimated motor speed to the speed adjustment module 312. In some implementations, the mapping is generated during End-of-Line (EOL) testing.

The speed adjustment module 312 receives the offset signal from the sensor offset estimation module 308 and generates an adjustment signal that is output to the speed control module 104. In an implementation, the speed adjustment module 312 accesses the memory 310 to determine an adjustment value corresponding to the estimated offset position. For example, the memory 310 includes a look-up table that stores one or more mappings of the estimated offset position of the rotor 204 to an adjustment value. The speed adjustment module 312 provides the adjustment value to the speed control module 104. The speed control module 104 adjusts the desired torque signal based on the adjustment value, and the adjusted desired torque signal is provided to the current control module 106. The speed adjustment module 312 also stores the adjustment value in the memory 310, which can be retrieved for vehicle diagnostic purposes.

Figure 3B:
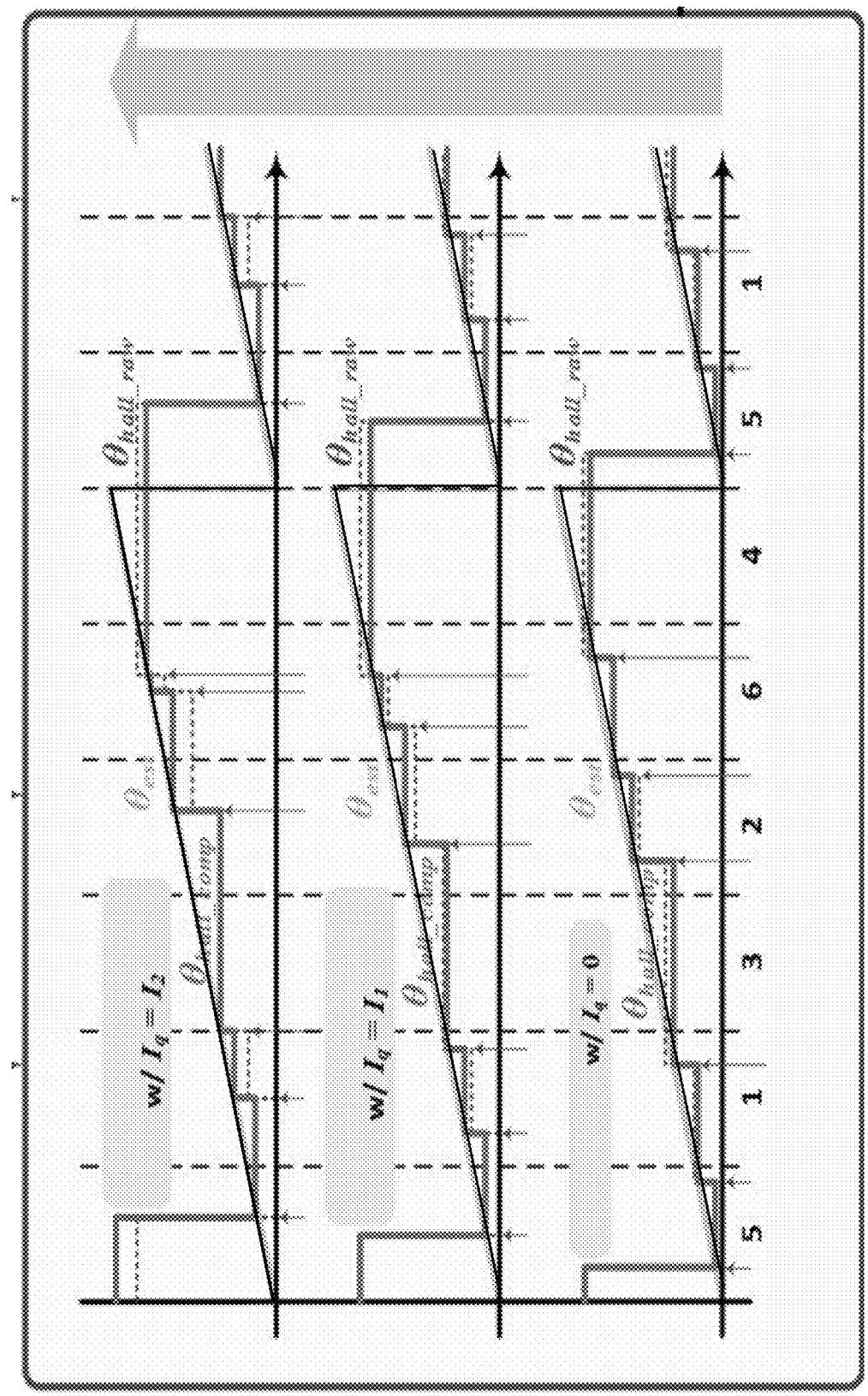
FIG. 3B is another example graph illustrating various current signals for energizing one or more stator windings.

FIG. 3B illustrates an example graph of the adjusted desired position signal ($\Theta_{hall\_comp}$), an unadjusted position signal ($\Theta_{hall\_raw}$), and the estimated position of the rotor ($\Theta_{est}$).

Figure 4:
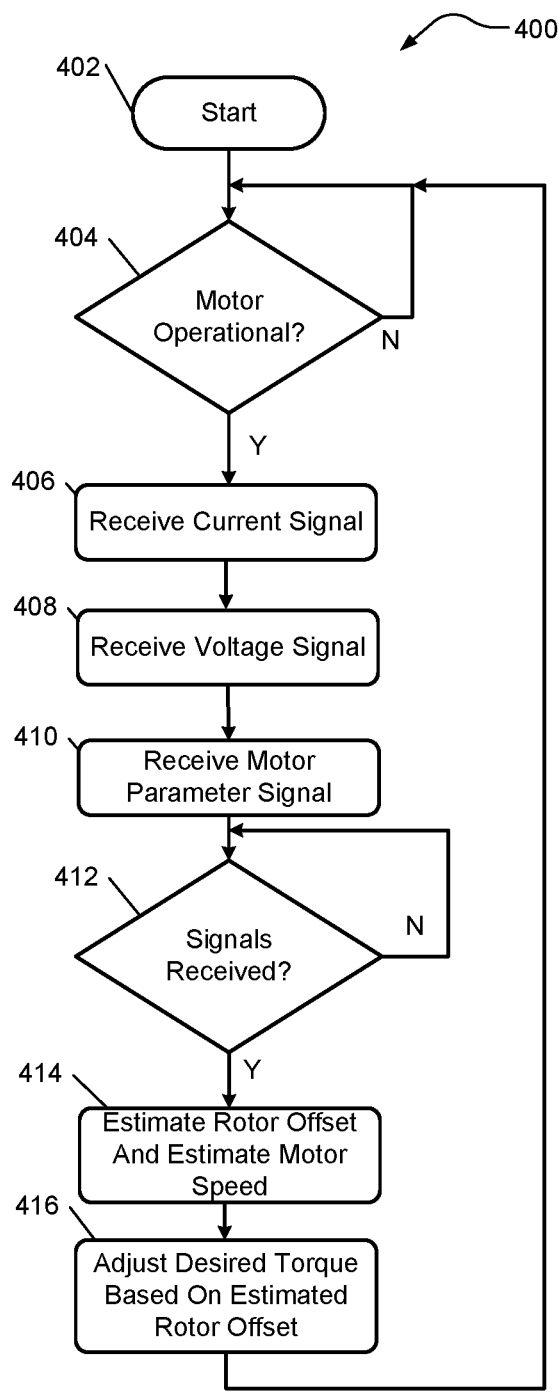
FIG. 4 is a flow diagram for estimating an offset of a rotor according to an example implementation of the present disclosure.

FIG. 4 is a flow diagram of an example method 400 for estimating the offset of the rotor 204 with respect to the desired position an estimated motor speed. The method 400 is described in the context of the modules included in the example implementation of the rotor position estimation module 114 shown in FIGS. 1 and 3 in order to further describe the functions performed by those modules. However, the particular modules that perform the steps of the method may be different than the description below and/or the method may be implemented apart from the modules of FIGS. 1 and 3. For example, the method may be implemented by a single module.

The method 400 begins at 402. At 404, a determination is made whether the motor 102 is operating. Any one of the modules 302, 304, 306 can determine whether the motor 102 is operating. If the motor 102 is not operating, the method returns to 404. If the motor 102 is operating, the method 400 transitions to 406. At 406, the motor current determination module 302 receives the motor current signal. At 408, the motor voltage determination module 304 receives the motor voltage signal. At 410, the motor parameter receiving module 306 receives one or more motor parameter signals.

At 412, the sensor offset estimation module 308 determines whether the motor current signal, the motor voltage signal, and/or the motor parameter signal have been received from the modules 302, 304, 306. If the motor current signal, the motor voltage signal, and/or the motor parameter signal have not been received, the method 400 returns to 412. If the motor current signal, the motor voltage signal, and/or the motor parameter signal have been received, the sensor offset estimation module 308 estimates the offset of the rotor 204 and estimates the motor speed based on the received signals. At 414, the speed adjustment module 312 generates the adjustment signal based on the estimated offset. At 416, the speed control module 104 adjusts the desired torque signal based on the adjustment value. The method 400 returns to 402.

Figure 5:
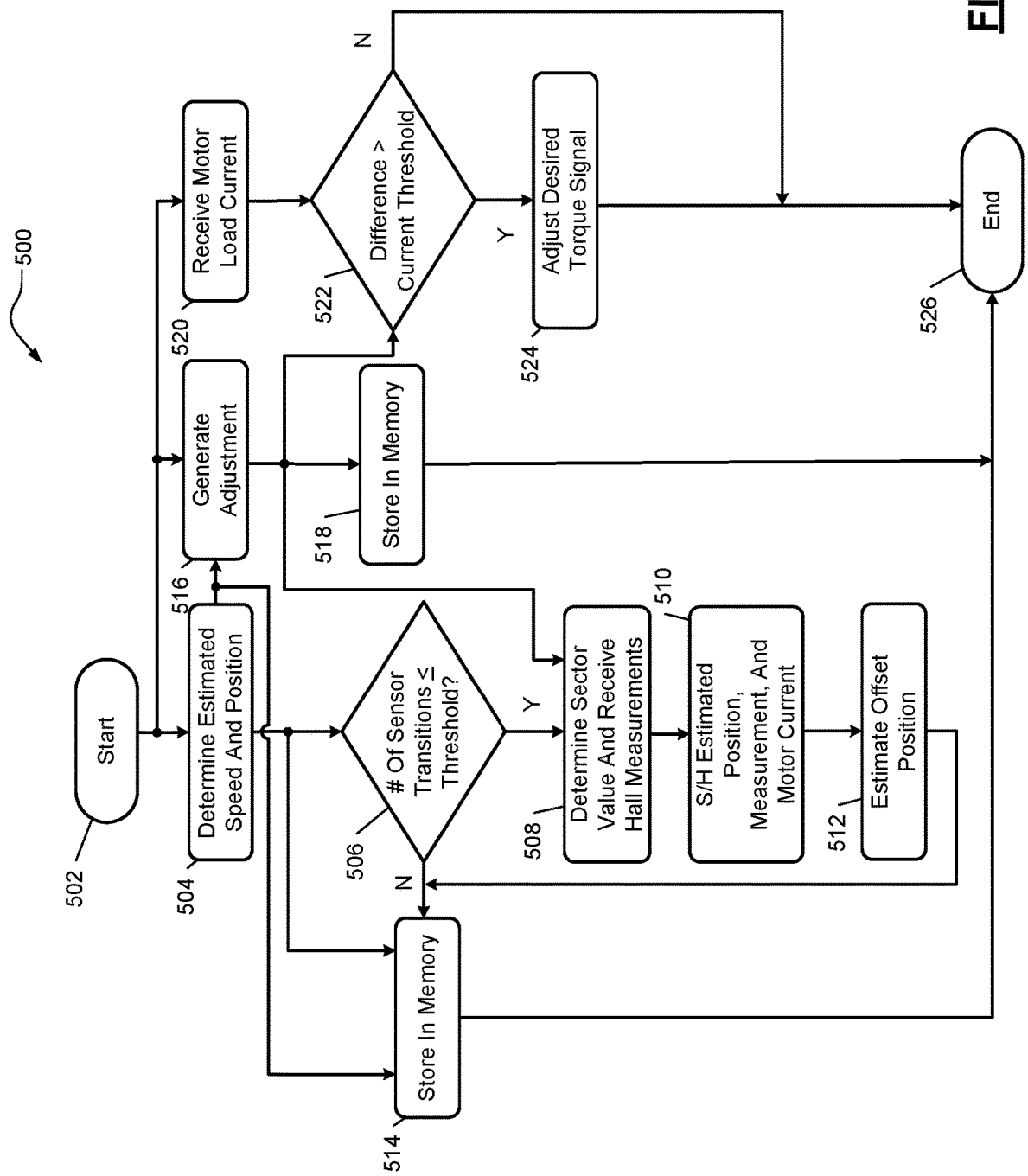
FIG. 5 is another flow diagram for estimating an offset of a rotor according to an example implementation of the present disclosure.

FIG. 5 is another flow diagram of an example method 500 for estimating the offset of the rotor 204 with respect to the desired position an estimated motor speed. The method 500 is described in the context of the modules included in the example implementation of the rotor position estimation module 114 shown in FIGS. 1 and 3 in order to further describe the functions performed by those modules. However, the particular modules that perform the steps of the method may be different than the description below and/or the method may be implemented apart from the modules of FIGS. 1 and 3. For example, the method may be implemented by a single module.

The method 500 begins at 502. At 504, the rotor position estimation module 114 estimates the position of the rotor 204 and estimates the motor speed as described above. At 506, the sensor offset estimation module 308 determines whether a number of sensor transitions is less than a predetermined threshold. A sensor transition may be defined as when a sensor 208 has made a three hundred and sixty degree rotation about the rotor 204.

If the number of sensor transitions is less than or equal to the predetermined threshold, the method 500 transitions to 508. If the number of sensor transitions is greater than the predetermined threshold, the method 500 transitions to 514. At 508, the sensor offset estimation module 308 determines a position sector value of the one or more sensors 208 and receives one or more Hall-effect measurements detected by the sensors 208. At 510, the sensor offset estimation module 308 samples and holds the estimated position of at least one sensor 208, the Hall-effect measurement corresponding to the least one sensor 208, and the motor current signal. At 512, the sensor offset estimation module 308 accesses the memory 310 to estimate the offset based on the estimated position of at least one sensor 208, the Hall-effect measurement corresponding to the least one sensor 208, and the motor current signal. At 514, the estimated speed, the estimated position, and the estimated offset are received and stored in the memory 310.

At 516, the speed adjustment module 312 generates the adjustment signal based on the estimated speed and a reference speed. The reference speed may correspond to an EOL speed. The adjustment signal is stored in the memory 310 at 518. At 520, a motor load current is received at the current control module 106. The current control module 106 determines whether a difference between the adjusted desired torque signal the motor load current is greater than a predetermined current threshold at 522. If the difference is not greater than the predetermined current threshold, the desired torque signal is adjusted at 524. If the difference is greater than the predetermined current threshold, the desired torque signal is not adjusted. The method 500 ends at 526.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a rotor position estimation module configured to generate an adjustment signal to adjust a desired torque signal for a motor, the rotor position estimation module comprising:
a sensor offset estimation module configured to estimate an offset position of a sensor based on (1) a motor current signal indicative of a current to rotate a rotor within the motor, (2) a motor voltage signal indicative of a voltage applied to a power inverter that provides the current to the motor, and (3) a motor parameter, wherein the sensor is disposed on the rotor; and
a speed adjustment module configured to generate the adjustment signal based on the estimated offset position.

2. The system as recited in claim 1, further comprising a speed control module configured to generate the desired torque signal, wherein the speed control module is configured to adjust the desired torque signal based on the adjustment signal.

3. The system as recited in claim 2, further comprising a current control module configured to generate a current signal based on at least one of the desired torque signal and the adjusted desired torque signal.

4. The system as recited in claim 3, further comprising the power inverter, wherein the power inverter is configured to generate the current based on the current signal and provides the current to a plurality of stator windings within the motor to rotate the rotor according to the current signal.

5. The system as recited in claim 4, further comprising a battery connected to the power inverter and the rotor position estimation module and is configured to provide direct current (DC) voltage.

6. The system as recited in claim 5, wherein the power inverter converts the DC voltage to a corresponding alternating current (AC) voltage and provides the AC voltage to the motor and the rotor position estimation module.

7. The system as recited in claim 4, further comprising the motor, wherein the motor includes a rotary assembly that drives a vehicle based on the desired torque signal.

8. The system as recited in claim 7, wherein the rotary assembly comprises the stator and the rotor.

9. The system as recited in claim 1, wherein the sensor comprises a Hall-effect sensor disposed on the rotor.

10. The system as recited in claim 1, further comprising memory that is configured to store the adjustment signal.

11. A method comprising:
generating an adjustment signal to adjust a desired torque signal for a motor;
estimating an offset position of a sensor based on (1) a motor current signal indicative of a current to rotate a rotor within the motor, (2) a motor voltage signal indicative of a voltage applied to a power inverter that provides the current to the motor, and (3) a motor parameter, wherein the sensor is disposed on the rotor;
generating the adjustment signal based on the estimated offset position; and
storing the adjustment signal in memory.

12. The method as recited in claim 11, further generating the desired torque signal, wherein the desired torque signal is adjusted based on the adjustment signal.

13. The method as recited in claim 12, further comprising generating a current signal based on at least one of the desired torque signal and the adjusted desired torque signal.

14. The method as recited in claim 13, wherein the power inverter is configured to generate the current based on the current signal and provides the current to a plurality of stator windings within the motor to rotate the rotor according to the current signal.

15. The method as recited in claim 14, wherein a battery is connected to the power inverter and is configured to provide direct current (DC) voltage.

16. The method as recited in claim 15, wherein the power inverter converts the DC voltage to a corresponding alternating current (AC) voltage and provides the AC voltage to the motor.

17. The method as recited in claim 14, wherein a motor receives the desired torque signal includes a rotary assembly that drives a vehicle based on the desired torque signal.

18. The method as recited in claim 17, wherein the rotary assembly comprises the stator and the rotor.

19. The method as recited in claim 11, wherein the sensor comprises a Hall-effect sensor disposed on the rotor.

20. A method comprising:
generating an adjustment signal to adjust a desired torque signal for a motor;
estimating an offset position of a sensor based on (1) a motor current signal indicative of a current to rotate a rotor within the motor, (2) a motor voltage signal indicative of a voltage applied to a power inverter that provides the current to the motor, and (3) a motor parameter, wherein the sensor is disposed on the rotor; and
by a speed adjustment module, generating the adjustment signal based on the estimated offset position.

* * * * *